United States Patent [19]

Babow et al.

[11] 4,410,922
[45] Oct. 18, 1983

[54] ADJUSTABLE HEAD MOUNT

[75] Inventors: David A. Babow, Foster City; William M. Nedley, Campbell, both of Calif.

[73] Assignee: Ampex Corporation, Redwood City, Calif.

[21] Appl. No.: 228,508

[22] Filed: Jan. 26, 1981

[51] Int. Cl.³ .................. G11B 5/56; G11B 21/24; B25G 3/02; F16D 1/00
[52] U.S. Cl. .................... 360/109; 403/362
[58] Field of Search .......... 360/104, 105, 106, 107, 360/109, 129; 403/362; 74/617

[56] References Cited

U.S. PATENT DOCUMENTS

| 2,681,152 | 6/1954 | Stindt | 403/362 |
|---|---|---|---|
| 3,476,349 | 11/1969 | Smith | 403/362 |
| 3,876,318 | 4/1975 | Crispell | 403/362 |
| 4,268,881 | 5/1981 | Saito | 360/109 |
| 4,314,296 | 2/1982 | Whittle | 360/109 |
| 4,329,723 | 5/1982 | Schoenmakers | 360/109 |
| 4,329,724 | 5/1982 | Clayton | 360/109 |

Primary Examiner—Robert M. Kilgore
Attorney, Agent, or Firm—Joel D. Talcott; Charles M. Carman, Jr.

[57] ABSTRACT

A magnetic transducing head is mounted on a transducing machine so that the angle of orientation (e.g., azimuth inclination) of the head with respect to the machine is adjustable as by means of a differential screw mechanism extending between two relatively pivotable portions of the mount. The screw mechanism comprises a manually-operable element having threads of two different pitches on the same axis, threaded respectively into the two mount portions. Thus the two mount portions are always held at an intended distance from each other without lost-motion play, and the sensitivity of orientation adjustment is increased, because the translation corresponding to unit angular movement of the screw is measured by the difference between the inverse-pitch dimensions of the two threads.

8 Claims, 3 Drawing Figures

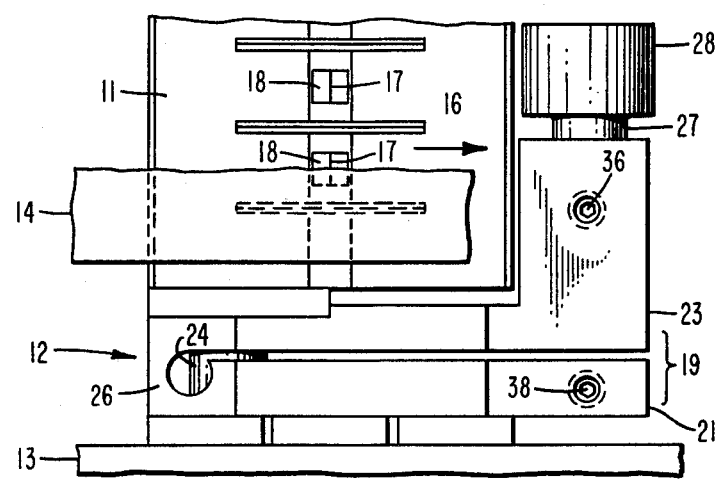
FIG_1
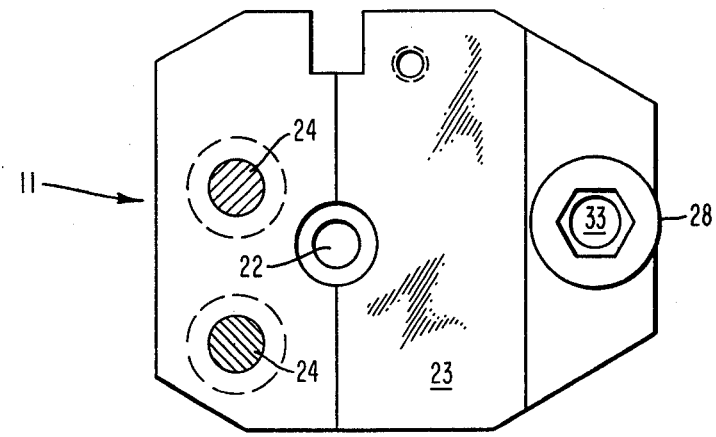
FIG_2
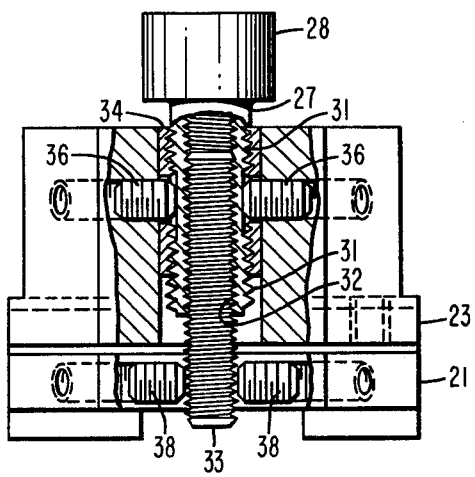
FIG_3

ADJUSTABLE HEAD MOUNT

BACKGROUND OF THE INVENTION

This invention relates to mounts for magnetic transducing heads, and particularly to mounts that are adjustable to change the angle of orientation (e.g., azimuth) of the head with respect to the machine.

In the magnetic transducing art including that of moving discs, drums and tapes it has always been important to maintain a predetermined orientation of the transducing head with respect to the machine and to the recording surface. Orientations in three orthogonal directions are important: first, the head gap must be not "tilted", i.e., it must be in a plane parallel (tangent) to the recording surface at the gap; second the head should squarely face the recording surface; and third, the "azumith" must be strictly transverse to the direction of movement of the recording surface across the gap. The azimuthal orientation is most sensitive and is more easily disturbed than the others; and azimuth field adjustability is therefore of advantage, to ensure interchangeability of records from machine to machine, and even replayability of the same record from time to time on the same machine.

In the art, two systems, and combinations of the two, have been most often used to achieve orientation adjustability. The first system, represented most clearly by U.S. Pat. No. 2,897,288, July 28, 1959 to Wijchman, comprises a mounting plate that is retained in spaced relation to a base by means of three triangularly-spaced bolts that pass freely through the plate and are threaded into the base. The plate is urged away from the base by spring means as that orientation of a head mounted on the plate is usually snugly sensitive to the positions of the three bolts. Selective turning of the bolts can then adjust the tilt and azimuth orientations of the head. However, outside forces accelerations, shocks, and vibrations can always cause transient compression of the springs, so that orientation is temporarily destroyed.

The second system of the art is represented most clearly by U.S. Pat. No. 3,882,543, May 6, 1975 to Richards. In this patent, a head, which is rotatably adjustable in the azimuthal plane, is secured in azimuthal position by two set screws engaging the sides of the head so as to produce oppositely directed moments of rotation. By backing-off one of the screws and tightening the other, the azimuthal position can be changed.

This arrangement overcomes the disadvantages of the first in environments in which the machine is subject to shock or vibration, but has the complication that two screws must be operated to make an adjustment.

A further problem with both systems of the prior art is that the sensitivity or "resolution" of adjustment is a function of the pitch of the adjusting screw; e.g., if the pitch is, say, 40 threads per inch, then for each revolution of the screw, the translation of the head mounting is 0.025 inches. It would be of advantage in some precision uses, if the transition per revolution were very much smaller.

Accordingly, it is an object of the present invention to provide a head mount of adjustable orientation, in which there is substantially no lost-motion play, and in which only one element needs to be generated to perform an adjustment.

It is a further object of the present invention to provide a head mount as above described, having increased sensitivity and precision response to operation of the adjusting element.

It is a still further object of the present invention to provide a head mount as above described, comprising fewer parts and being manufacturable with increased ease and economy.

BRIEF DESCRIPTION OF THE INVENTION

These and other objects are attained in the present invention by means of the following structure. A magnetic transducing head is mounted on a transducing machine so that the angle of orientation (e.g., azimuth inclination) of the head with respect to the machine is adjustable as by means of a differential screw mechanism extending between two relatively pivotable portions of the mount. The screw mechanism comprises a manually-operable element having threads of two different pitches on the same axis, threaded respectively into the two mount portions. Thus the two mount portions are always held at an intended distance from each other without lost-motion play, and the sensitivity of orientation corresponding to unit angular movement of the screw is measured by the difference between the inverse-pitch dimensions of the two threads.

DESCRIPTION OF THE DRAWINGS

FIG. 1 is an elevation view of the face and head gap of a magnetic transducing head mounted on the mount of the invention;

FIG. 2 is a plan view of the mount of FIG. 1, not including the transducing head; and FIG. 3 is a broken-away right-side view of the mount of FIG. 1, not including the transducing head.

DETAILED DESCRIPTION OF THE PREFERRED EMBODIMENT

Referring now to the drawings and particularly to FIGS. 1 and 2, there is shown a multi-track magnetic head stack 11, mounted on a mount 12, which in turn is secured to the top plate (tape deck) 13 of a magnetic transducing machine. In this case the machine is adapted for recording and reproducing signals on a magnetic tape 14 that is moving longitudinally (arrow 16) transversely across the magnetic gaps 17 of the individual heads 18.

The tape is guided in an unchanging path by guide means (not shown) and it is desired to maintain the head gaps 17 perpetually strictly transverse to the direction (arrow 16) of tape movement.

To this end, the mount 12 is provided with a base 19 including a first portion 21 that is secured to deck 13 by means of a bolt 22; and a second portion 23 that is secured to the head stack 11 by bolts 24. The portions 21 and 23 are pivotable with respect to one another in the plane of azimuth adjustment (i.e., the plane of the paper for FIG. 1) as by means of a flexible nexus portion 26 that is integral with both portions 21, 23 of the base 19, so that the lost motion play that is associated with separate pivot-pin structure may be avoidable.

To this end, the nexus may be flexible but non-resilient if the tolerances between the adjustment elements later to be described are sufficiently small to avoid objectionable lost-motion play or, if it is desired that such tolerances be greater, the nexus 26 may also be resilient and springly, so as to load the adjustment elements toward one extreme of their accumulated tolerance range.

Referring now to FIG. 3, it will be seen that the adjustment elements comprise a differential-thread screw arrangement that has the three advantages desired in the invention, namely: (1) solid screw positioning of the head, (2) with only one adjustment screw to be operated, and (3) greater sensitivity of adjustment.

In FIG. 3, the element that must be moved to effect an adjustment is a shank element 27, provided with a knob 28 for manual operation.

The shank 27 is of hollow cylindrical tubular shape, and is threaded in two different places with two different thread systems 31, 32; the system 31 being formed as a male system on the outer cylindrical surface of the shank 27, and the system 32 being formed as a female system on the inner cylindrical surface of the shank 27. Both systems are of the same handedness (e.g., the illustrated threads are both right-handed), but are of different pitches. The difference in the pitches is greatly exaggerated in the Figure for clarity of illustration, but in an actual illustrative embodiment, the male thread system 31 has 32 threads to the inch and the female system 32 has 40 threads to the inch. Thus, when the female system 32 is engaged with a correspondingly rounded extension member 33 extending from the first base portion 21, and the shank element 27 is threaded through a hollow cylindrical sleeve 34 that is secured to the second base portion 23, then rotation of the knob 28 through one revolution translates the upper (second) base portion 22 only 0.03125−0.0250=0.00625 inches with respect to the lower (first) base portion 21 in the region of the screw axis. In contrast, if either of the two thread systems were to be used exclusively, as in the prior art, then the corresponding translation would be four to five times as great per revolution, i.e., 0.03125 inches for 32 threads per inch, or 0.0250 inches for 40 threads per inch. Thus, the differential-threaded arrangement of the present invention has greater adjustment sensitivity, and requires as well only one element to be moved in making the adjustment.

It is not essential that a sleeve such as the sleeve 34 be used, for the threads to mate with the male thread of shank 27 could as well be formed in the body of the portion 22 if the element 33 is not threaded through the portion 21; but the sleeve is shown because it is used in an actual apparatus, primarily for greater ease and convenience in manufacture and assembly. As here shown, the sleeve is retained by set screws 36, which pass though conforming openings in the sleeve to engage the shank 34 as well, to serve as locking clamps therefor. To avoid burring threads, the male thread system 31 is relieved in the neighborhood of the set screws 36, which then also act as limit stops to the range of adjustment. When an adjustment is to be made, the set screws 36 are loosened somewhat to free the shank 27 but still function to retain the sleeve 34 in the manner of a pin.

Likewise, the extension element 33 is locked in position by means of second set screws 38; however this element does not need to be moved during an adjustment.

While the adjustment mechanism of the invention has been described in relation to the adjustment of head azimuth, it will be understood that such mechanism may equally well and as easily be applied to adjustments in either of the other two other two orthogonal planes, and that all three of such adjustments of orientation are meant to be covered by the accompanying claims.

Thus there has been described an apparatus in which a magnetic transducing head is mounted on a transducing machine so that the angle or orientation (e.g., azimuth inclination) of the head with respect to the machine is adjustable as by means of a differential screw mechanism extending between two relatively pivotable portions of the mount. The screw mechanism comprises a manually-operable element having threads of two different pitches on the same axis, threaded respectively into the two mount portions. Thus the two mount portions are always held at an intended distance from each other without lost-motion play, and the sensitivity of orientation adjustment is increased, because the screw is measured by the difference between the inverse-pitch dimensions of the two threads.

I claim:

1. A mount for supporting a magnetic transducing head on a transducing machine and for adjusting the orientation of said head in at least one predetermined adjustment plane, comprising:
   a base having first and second portions pivotable with respect to one another in said adjustment plane, and adapted for respective attachment to said machine and to said head;
   one of said base portions having a male threaded portion of predetermined pitch and the other base portion having a female threaded portion of the same handedness but of different pitch, said two threaded portions constituting a set of threaded portions centered on the same axis and coextensive on the length thereof; and
   a shank element having a second set of male and female threaded portions also centered on said axis and coextensive on the length thereof, the male threaded portion of each set engaging and mating with the female threaded portion of the other set, so that rotation of said shank about said axis causes said base portions to pivot with respect to one another to a new orientation of said head with respect to said machine.

2. A mount as described in claim 1, wherein:
said first base portion has a cylindrical threaded extension member extending into and threaded into said female threaded portion of said shank.

3. A mount as described in claim 2, wherein:
said extension member is a separate threaded member threaded into said first base portion and retained therein by laterally-threaded first set-screw means.

4. A mount as described in claim 2, wherein:
said second base portion has a cylindrical bore formed therein, and a hollow cylindrical sleeve element fitting snugly slidably within said bore and retained therein by laterally-threaded second set screw means;
said shank element being threaded through said hollow cylindrical sleeve element by the male-threaded portion of said shank.

5. A mount as described in claim 4, wherein:
said sleeve is pierced to pass said second set-screw means to engage and to frictionally retain said shank element, while retaining said sleeve in the manner of a pin.

6. A mount as described in claim 5, wherein:
said shank is stripped of male threads in the region thereof engageable by said second set-screw means.

7. A mount as described in claim 1, wherein:
said base portions are connected by an integral flexible nexus for said relative pivoting motion of said first and second portions without lost-motion play therebetween.

8. A mount as described in claim 7, wherein:
said nexus is also resilient; and
said threaded portions of said shank and base are made to fit together loosely, with said resilient nexus taking up the lost-motion play therebetween.

* * * * *

UNITED STATES PATENT AND TRADEMARK OFFICE
CERTIFICATE OF CORRECTION

PATENT NO. : 4,410,922            Page 1 of 3
DATED : October 18, 1983
INVENTOR(S) : David A. Babow and William M. Nedley It is certified that error appears in the above-identified patent and that said Letters Patent is hereby corrected as shown below:

The title page should be deleted to appear as per the attached title page.

The sheet of Drawing consisting of Figs. 1-3 should be deleted to appear as per the attached sheet.

Column 1, line 60, change "transition" to --translation--;

Column 4, line 41, change "Claim 2" to --Claim 3--.

Signed and Sealed this

Twenty-third Day of July 1985

[SEAL]

Attest:

DONALD J. QUIGG

Attesting Officer      Acting Commissioner of Patents and Trademarks

United States Patent [19]

Babow et al.

[11] 4,410,922
[45] Oct. 18, 1983

[54] ADJUSTABLE HEAD MOUNT

[75] Inventors: David A. Babow, Foster City; William M. Nedley, Campbell, both of Calif.

[73] Assignee: Ampex Corporation, Redwood City, Calif.

[21] Appl. No.: 228,508

[22] Filed: Jan. 26, 1981

[51] Int. Cl.³ .................. G11B 5/56; G11B 21/24; B25G 3/02; F16D 1/00
[52] U.S. Cl. ................................ 360/109; 403/362
[58] Field of Search ............... 360/104, 105, 106, 107, 360/109, 129; 403/362; 74/617

[56] References Cited

U.S. PATENT DOCUMENTS

| 2,681,152 | 6/1954 | Stindt | 403/362 |
|---|---|---|---|
| 3,476,349 | 11/1969 | Smith | 403/362 |
| 3,876,318 | 4/1975 | Crispell | 403/362 |
| 4,268,881 | 5/1981 | Saito | 360/109 |
| 4,314,296 | 2/1982 | Whittle | 360/109 |
| 4,329,723 | 5/1982 | Schoenmakers | 360/109 |
| 4,329,724 | 5/1982 | Clayton | 360/109 |

Primary Examiner—Robert M. Kilgore
Attorney, Agent, or Firm—Joel D. Talcott; Charles M. Carman, Jr.

[57] ABSTRACT

A magnetic transducing head is mounted on a transducing machine so that the angle of orientation (e.g., azimuth inclination) of the head with respect to the machine is adjustable as by means of a differential screw mechanism extending between two relatively pivotable portions of the mount. The screw mechanism comprises a manually-operable element having threads of two different pitches on the same axis, threaded respectively into the two mount portions. Thus the two mount portions are always held at an intended distance from each other without lost-motion play, and the sensitivity of orientation adjustment is increased, because the translation corresponding to unit angular movement of the screw is measured by the difference between the inverse-pitch dimensions of the two threads.

8 Claims, 3 Drawing Figures

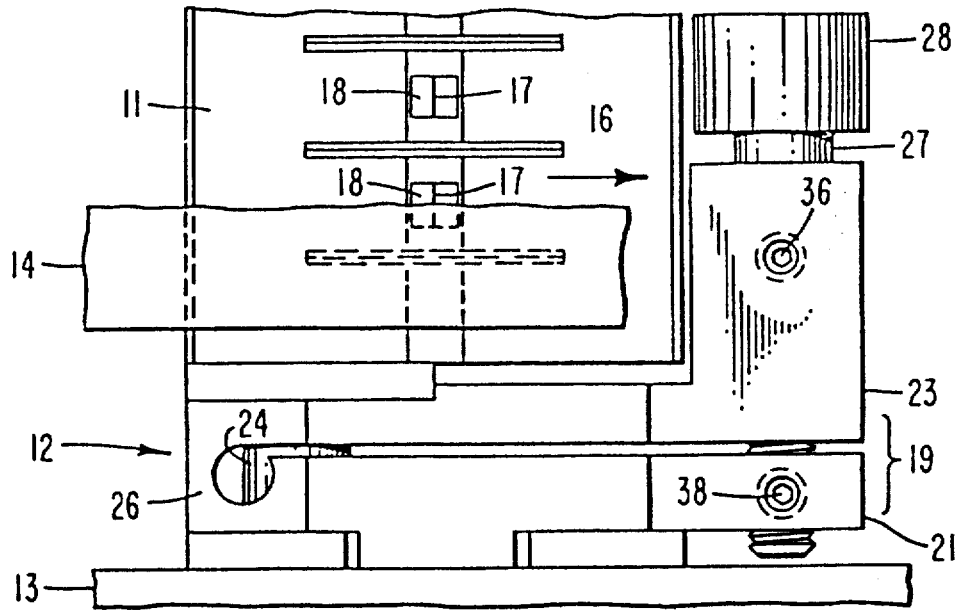

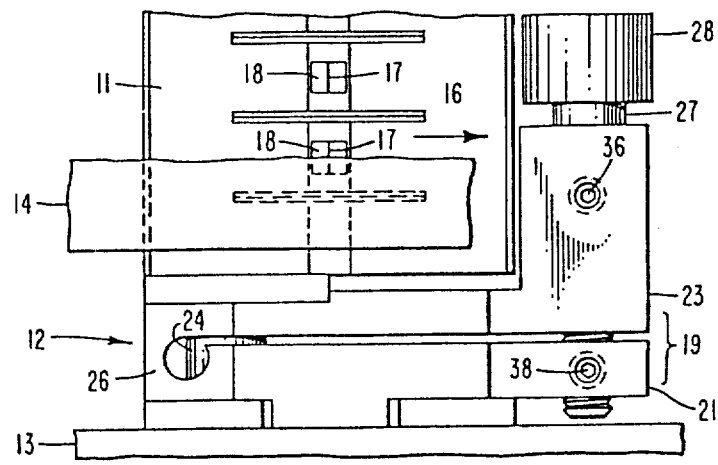
FIG_1
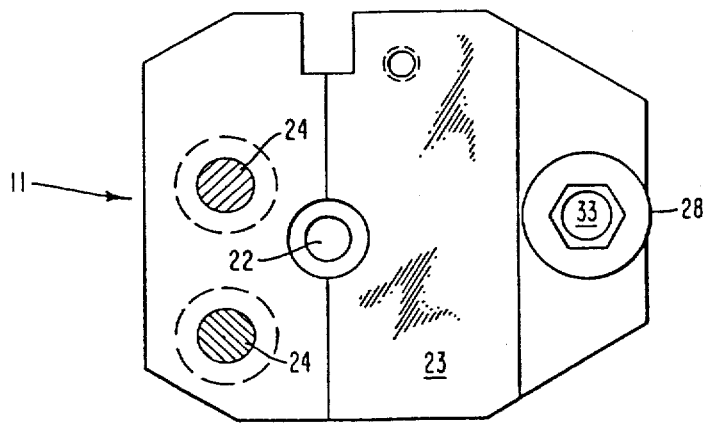
FIG_2
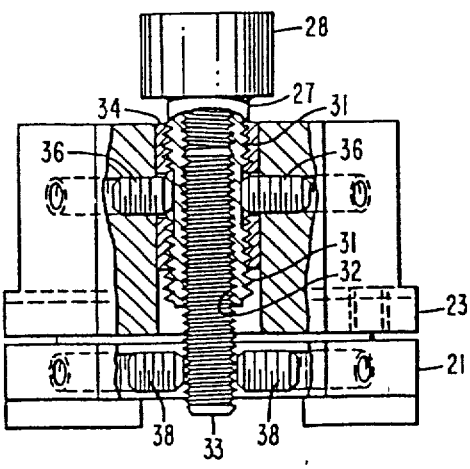
FIG_3